United States Patent [19]

Iwata et al.

[11] 4,371,245

[45] Feb. 1, 1983

[54] PHOTOGRAPHING LENS SYSTEM WITH FOCUS INFORMING MEANS

[75] Inventors: Hiroshi Iwata, Ikoma; Tsunemi Yoshino, Ibaraki; Toshitsugu Kashihara, Nara; Akitoshi Morioka, Osaka, all of Japan

[73] Assignee: West Electric Company, Ltd., Osaka, Japan

[21] Appl. No.: 290,402

[22] Filed: Aug. 5, 1981

[30] Foreign Application Priority Data

Aug. 8, 1980 [JP] Japan .................................. 55-109369

[51] Int. Cl.³ .................... G03B 3/00; G03B 13/18; G02B 7/04
[52] U.S. Cl. ..................................... 354/198; 350/255
[58] Field of Search ................ 354/25 R, 25 A, 25 P, 354/25 N, 31 F, 53, 60 E, 60 L, 195, 197, 198, 286, 289; 352/140, 142; 350/255; 250/201, 204; 356/3, 5

[56] References Cited

U.S. PATENT DOCUMENTS 3,940,777  4/1982  Komine .............................. 352/140
4,323,303  4/1982  Enomoto ............................. 354/25

FOREIGN PATENT DOCUMENTS

55-155337  12/1980  Japan ................................. 354/195

Primary Examiner—William B. Perkey
Attorney, Agent, or Firm—Cushman, Darby & Cushman

[57] ABSTRACT

A photographing lens, which is to be mounted on a camera in an interchangeable manner is provided with a focus-informing means, which informs the photographer of focussings of the photographing lens during manual focussing operation thereof by buzzer or by small lamp, thereby enabling to provide a semi-automatic focussing for a conventional camera body without provision of an automatic focus adjusting means.

17 Claims, 9 Drawing Figures

PHOTOGRAPHING LENS SYSTEM WITH FOCUS INFORMING MEANS

BACKGROUND OF THE INVENTION

1. Field of the Invention

The present invention relates to an improvement of a photographing lens system.

2. Prior Arts

Hitherto, such a conventional focussing system of a camera has been known that the camera having a permanently mounted lens (not in an interchangeable manner) and distance is measured by means of optical means or ultrasonic means built in a camera body and the lens is driven by an electric motor or an electromagnetic means so as to automatically to focus the lens to the measured distance.

However, in such conventional automatic focussing system, the system was usually designed for the lens which was permanently mounted on the camera body, and therefore, a known utility of interchanging use of several lenses to a camera could not be utilized. Therefore, for single lens reflex type camera, another focussing system has been proposed. That is, distance measurement is made by means of TTL (through the lens) type measuring sensors disposed in the path of light after the lens, thereby enabling interchanging of the photographing lens.

Figure 1:
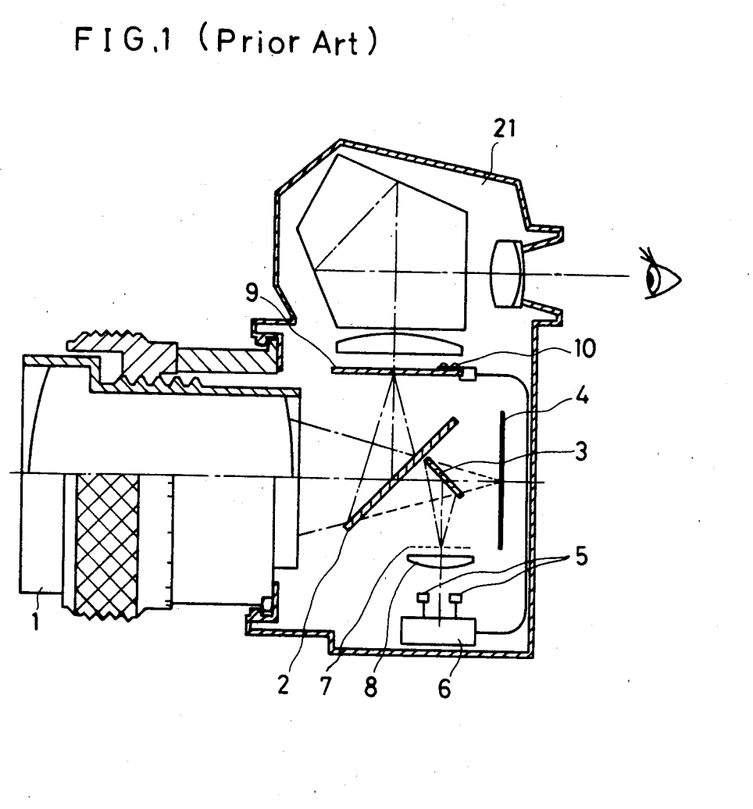
FIG. 1 is a sectional view of a conventional camera provided with a focussing means having a conventional through-the-lens type optical distance measuring device.

FIG. 1 shows a schematic sectional view of such conventional system provided in the single lens reflex type camera. Light which passed the photographing lens 1 is reflected by a moving mirror 2 to the finder part 21, and a part of the light is reflected by a sub-mirror 3 to photoelectric sensors 5 and 5', through an electrically vibrating lattice 7 and a condenser lens 8. In this known system, a focussing of the photographic image is made when the phases of the output signals from the sensors 5 and 5' become the same, and a loss of the focussing is detected by that the phases become different from each other. The outputs of the sensors 5 and 5' are lead to a differential amplifier 6 and the latter's output energizes LED 10 which can be observed for instance in the field of finder. In such system, since the focussing information system operates with the light after passing the photographing lens, the focussing information system can be used for any of interchangeable lens. However, such conventional system has a defect that the sub-mirror 3 must have a complicated mechanism for quick removal from the light path at a photographing moment in a very minute space. Furthermore, in order to lead a part of light to the sensors 5 and 5', the main mirror 2 must have a half-mirror (i.e., semi-reflecting and semi-transparent part) at the center thereof, and therefore, the light given to the finder 21 is somewhat weakened at the central part, which is likely to result in a defect of difficulty of observation of the photographic object at the center part.

On the other hand, if a distance measurement of device using an ultrasonic wave were built in the camera body of a lens-interchangeable camera as a common use for interchanged lenses, the device must has a means for adapting to differences between focal lengths or picture angles of different lenses, and such means to compensate the differences would become very complicated.

SUMMARY OF THE INVENTION

Therefore, the present invention purports to provide a rather simple and compact system wherein each of interchangeable lens itself has a focus informing means, which issues focussing information of change of sound or change of lighting of indication lamp when a manual focussing means is manually operated and the lens reaches a focussing state. The lens in accordance with the present invention is applicable to any camera body which is not provided with an automatic focussing means or a distance measuring means.

DESCRIPTION OF THE PREFERRED EMBODIMENTS

A photographic lens system for a photographic camera in accordance with the present invention comprises:

a photographic lens, a lens system housing for holding the photographic lens, including a mounting means for detachable mounting on a camera body, the lens system housing comprising at least a means for adjusting focus by movement thereof and a cooperating handle, by which focusing is made, an electrically operated distance measuring means, provided in said lens system housing, for measuring distance to a principal object and generating a measured distance signal corresponding to the measured distance, an electrically operated adjustment indication means provided in the lens system housing, for generating an adjusted distance signal corresponding to the distance of said principal object at which the lens is adjusted, an electrically operated comparator circuit which compares said measured distance signal and the lens adjustment signal, and generates a focus informing signal, at least one electrically operated informing means responsive to said focus information signal, for generating discernable indicia of the focussing, and a switch cooperation with said handle on said lens system housing for selectively applying power from a power source to said distance measuring means, the adjustment indication means, the comparator circuit, and the informing means.

Figure 2A:
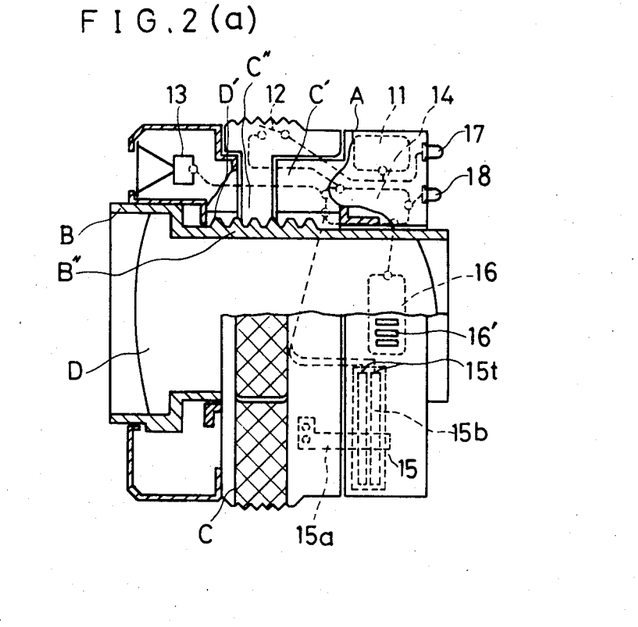
FIG. 2(a) is a sectional view of a photographing lens system with focus informing means embodying the present invention.

FIG. 2(a) is a schematic sectional side view of the photographing lens system for a photographic camera in accordance with the present invention.

A lens system housing A comprises a known mounting means, for example screw thread or any other type with which the housing is to be mounted on a camera body. A lens sleeve B which fixedly holds a photographic lens D (hereinafter simply referred to as lens D) is held in the housing A slidably in the axial direction but non-rotatably around the lens axis by a known art such as a sliding pin engaged in a slot (not shown) in the direction parallel to the axis. An adjusting ring C as a handle which is for focus-adjusting by manipulation thereof is rotatably mounted on the housing A and has engaging screw thread C'' which slidingly engages with the screw thread B'' on the outer face of the lens sleeve B. The lens system housing A further contains therein the following components: A DC power source or a small primary battery 11, an electronic circuit 14, a variable resistor 15 which varies its resistance between output terminals 15t, an informing means 16 such as buzzer or LEDs, an ultrasonic transducer 13 and a power switch 12 which is a simple mechanical switch linked with a focussing ring C so as to be closed by a part of force to grip the ring or an electronic switch to be closed by detecting touch by finger.

Furthermore, on suitable place outside the lens system housing A, there are provided a connector 17 for connection to an outside power source disposed, for instance in the camera body or motor driving unit, and another connector 18 which issues focussing information signal to outside, for instance an indication lamp in a view finder of the camera body.

Figure 2B:
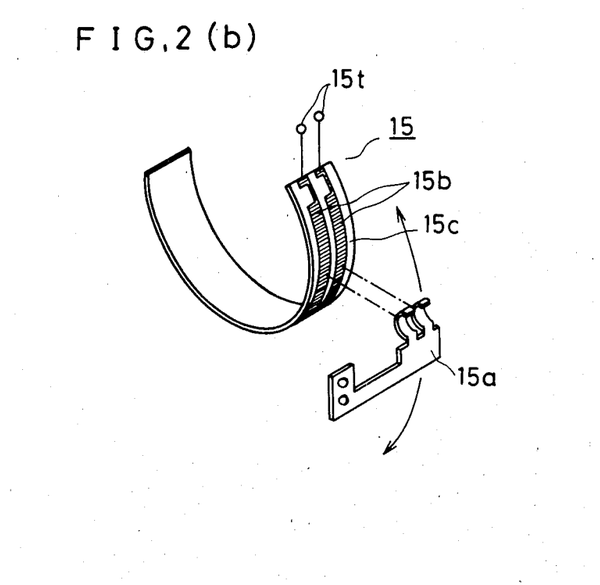
FIG. 2(b) is a perspective view of a variable resistor 15 of the apparatus of FIG. 2(a).

FIG. 2(b) is a perspective view showing the variable resistor 15 of FIG. 2(a). As is shown in FIG. 2(b), a curled insulation substrate 15c has two parallel slide resistor stripes 15b each having terminals 15t. The substrate 15c is fixed on a suitable non-moving cylindrical structure (not shown) formed inside the lens system housing A. The variable resistor 15 further comprises a shortcircuiting sliding contact 15a having two contact points which are to slide along the slide resistor stripes 15b. The sliding contact 15a is fixed inside the focussing ring C, so that, as the focussing ring C is rotated, the sliding contact 15a changes contacting positions on the slide resistor stripes 15b and varies resistance between the terminals 15t.

The operation of the photographing lens system shown above is as follows: When a user moves the focussing ring C, the switch 12 is closed by means of pressing of the ring at manipulation thereof or by finger or at detection of finger touch thereto through of electrostatic variation. As a result of closing of the power switch 12, electric current is fed from the DC power source 11 to the electronic circuit and above-mentioned other components. The ultrasonic sensor 13 periodically transmits ultrasonic wave for a very short time to the photographic object. Then ultrasonic wave reflected by the photographic object is transduced to electric signal by the same transducer 13. The electric signal is processed by the electronic circuit 14, thereby to produce a measured distance signal corresponding to the distance measured by the ultrasonic reflection. This measured distance signal is compared with a focus information signal which is produced by utilizing the resistance of the variable resistor 15 linked to the focussing ring C. The comparator issues an output signal by which the user can know the moment when the focussing of the lens is right, namely, when the electric amount e.g. voltage, of the measured distance signal becomes equal to the focus information signal.

When the camera body or a film driving means to be attached to the camera body has been designed to have a counterpart connector to the connector 17 of the power source circuit, and a relatively large DC power source therein, then it is possible to utilize the relatively large DC power source.

When the camera body has a counterpart connector to the connector 18 and has some sophisticated apparatus to take advantage of the output signal of the electronic circuit 14, for example to automatically release a shutter synchronizing to the focussing, then the connector 18 can transmit the output signal of the electronic circuit 14 therethrough.

Since no motor or electromagnet is used to drive the lens focussing, but the focussing is to be made manually, the DC power source 11 contained in the housing can serve satisfactorily for a very long time.

Figure 3:
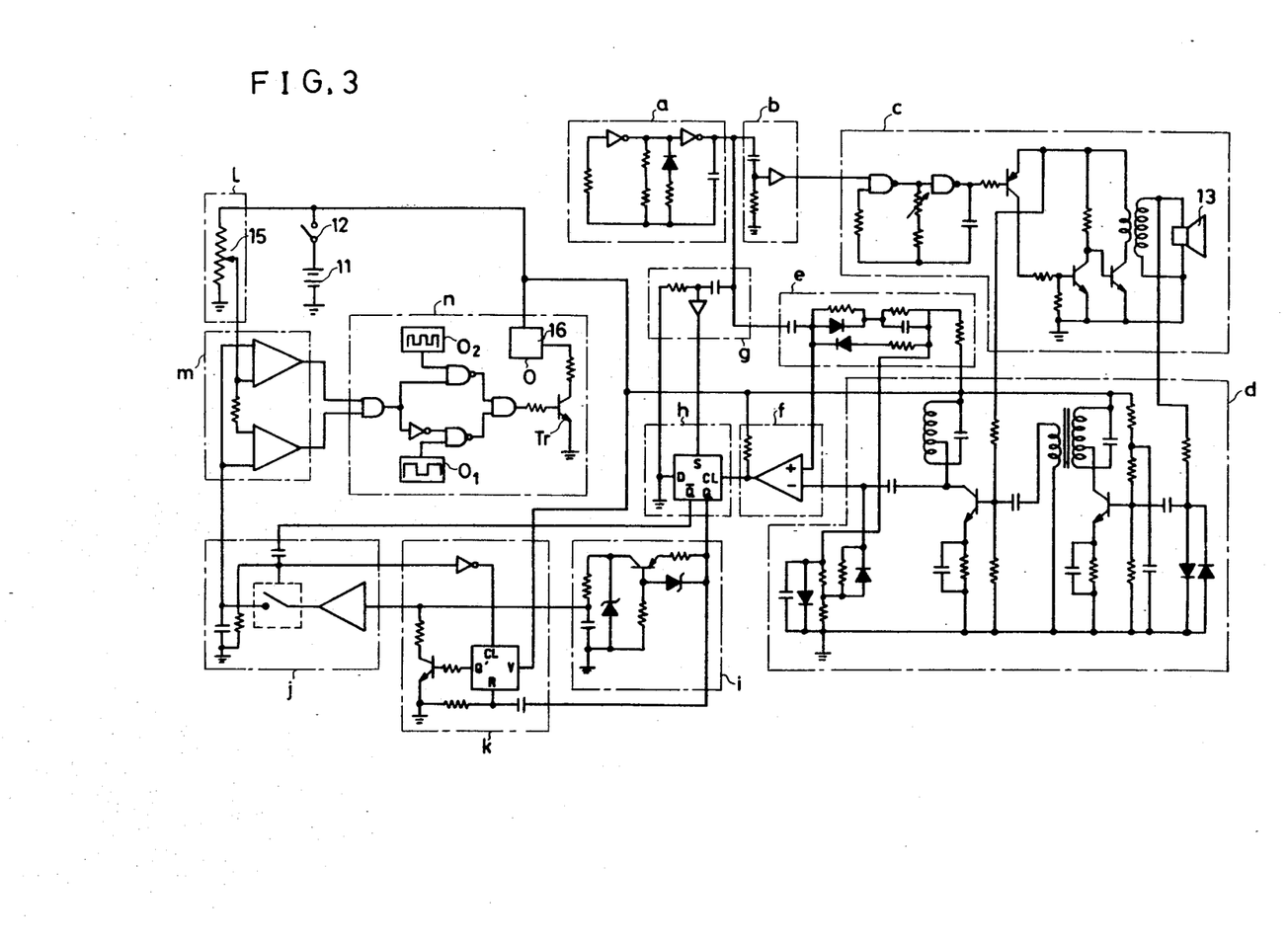
FIG. 3 is a circuit diagram of the apparatus of FIG. 2(a).
Figure 4:
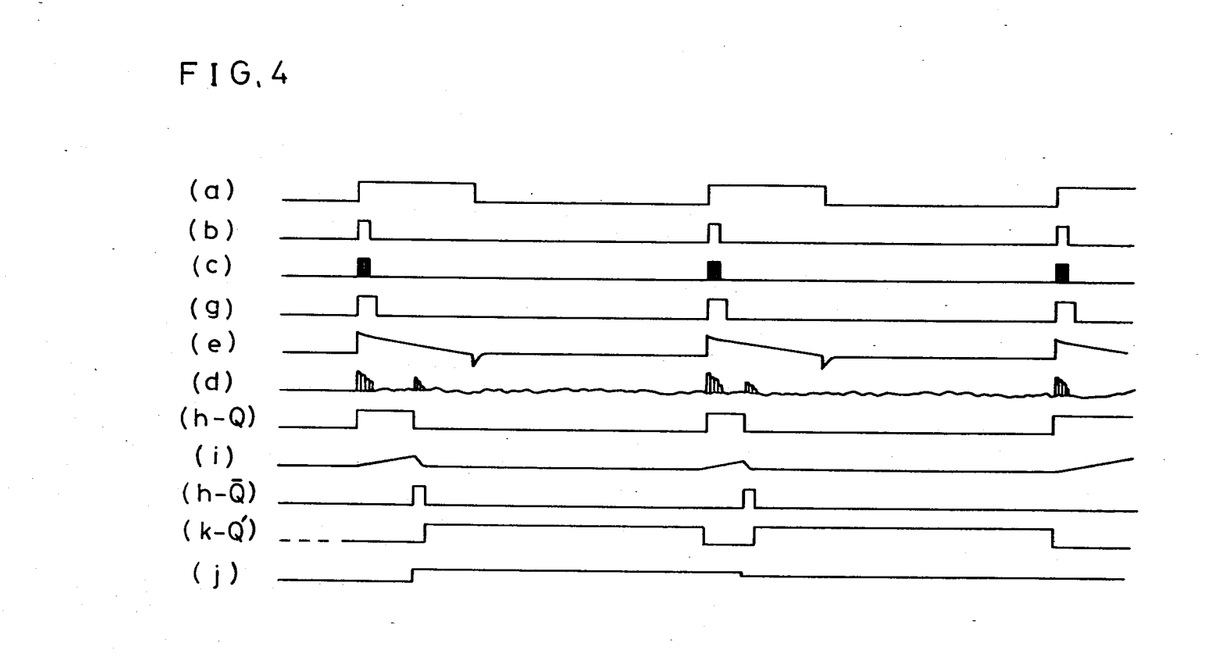
FIG. 4 is a waveform chart showing waveforms of various parts of the circuit of FIG. 3.

FIG. 3 shows an example of the electronic circuit 14 of the apparatus in accordance with the present invention. And FIG. 4 shows waveforms of the signals of various parts of the appartus embodying the present invention. In FIG. 3, marks a, b, c, d, e, f, g, h, i, j, k, l, m, and n designate respectively the following circuits:

a . . . measuring distance limit signal generator,
b . . . transmission timing circuit,
c . . . ultrasonic signal generator,
d . . . ultrasonic signal receiver,
e . . . reference voltage generator,
f . . . level detector,
g . . . distance measure-ordering circuit,
h . . . distance signal circuit,
i . . . integration circuit,
j . . . read-in circuit,
k . . . resetting circuit
l . . . lens position signal circuit
  (i.e., the variable resistor),
m . . . double-ended limit detector,
n . . . focus informing circuit
  (i.e., the buzzer or LEDs).

The operation of the above-mentioned circuit of FIG. 3 is now elucidated in reference to the waveform chart of FIG. 4.

When the power switch 12 is closed and the current from the DC power source 11 is fed to the whole parts of the circuit, then the measuring distance limit signal generator a sends square wave signals of a predetermined duty time, for instance 120 m sec as shown by (a) of FIG. 4. The square wave signal repeats at a predetermined interval of for instance 500 m sec. By receiving the signal (a) of FIG. 4 from the measuring distance limit signal generator a, the transmission timing circuit b generates pulse signal of FIG. 4(b) of a predetermined duty time, for instance 1 m sec. By receiving the signal (b) of FIG. 4, the ultrasonic signal generator c generates an ultrasonic signal of, for instance, 60 KH for the duty time of FIG. 4(b), and the transducer 13 transmit ultrasonic wave.

Then the reflected ultrasonic wave is received by the transducer 13, and a signal caused by it is sent to the ultrasonic signal receiver d where the received signal is amplified. The receiver d receives both the transmitted signal and the received signal and outputs the signal of FIG. 4(d) to the level detector f. On the other hand, the reference voltage generator e receives the pulse signal of FIG. 4(a) from the measuring distance limit signal generator a, and issues tapered reference voltage of FIG. 4(e) to the level detector f.

The level detector f compares the input signals of FIG. 4(d) from the receiver d and the reference voltage of FIG. 4(e) from the reference voltage generator e. And the level detector f outputs an H-level signal when the signal from the receiver d is larger than that from the reference voltage generator e. At the same time, the distance measure-ordering circuit g receives the signal from the measuring distance limit signal generator a and sends a distance measure ordering signal of FIG. 4(g) to the set-input-terminal S of the distance signal circuit h. The distance signal circuit h is a D-flip-flop circuit. The circuit operates, for instance in a manner that, when its D terminal is held to H level, the circuit is made to set state upon input signal to the set-input-terminal S to turn the terminal Q to H-level and the terminal $\overline{Q}$ to L-level, thereby making the integration of the integration circuit i start. And at the same time the resetting circuit k is driven by the turning to H of the terminal Q and therefore, the output terminal Q' of the resetting circuit k is turned to L level.

Since the output signal of FIG. 4(g) has a longer duty time than that of the ultrasonic signal of FIG. 4(c) from the ultrasonic signal generator c, even at receiving of the signal from the level detector f the output terminal Q of the distance signal circuit h keeps on holding H-level. This H-level turns to L-level when reflected ultrasonic wave is received and hence the level detector circuit f sends output to the clock input terminal CL, thereby terminal Q of the distance signal circuit h sends out the output signal (h-Q) of FIG. 4 to the integration circuit i. At the same time of the turning, the other output terminal $\overline{Q}$ turns to H-level, and sends output signal (h-$\overline{Q}$) of FIG. 4 to the read-in circuit j and the reset circuit k.

When the output terminal Q of the distance measure-ordering circuit h turns down to L-level, the integration circuit stops integration, and hence outputs the signal i of FIG. 4.

At the same time, the read-in circuit j receives read-in instructing signal (h-$\overline{Q}$) from the $\overline{Q}$ terminal of the distance signal circuit h.

On the other hand, the output terminal Q' of the reset circuit k has been L-level by means of the H-level signal of the output terminal Q of the distance signal circuit h, and the signal of this terminal Q' turns up to H-level when the read-in instruction signal (h-$\overline{Q}$) at the output terminal $\overline{Q}$ turns to L level, and hence the reset signal becomes H-level as shown by FIG. 4 (k-Q'), and thereby the integration circuit i discharges the integrated charge and resets. The double-ended limit detector m compares the level of the measured distance signal represented by the FIG. 4(j) with the level of the voltage from the lens position signal circuit 1, and outputs the resultant comparison output to the focus informing circuit n, wherein the buzzer ringing frequency is controlled by the comparison output signal. For example, when the focussing is right, a higher pitch repetition of sound is made by a higher frequency oscillator $O_2$ and when the focussing is out, a lower pitch repetition of sound is made by a lower frequency oscillator $O_1$. These oscillators $O_1$ or $O_2$ selectively control the work of the transistor Tr. Therefore, a buzzer or an LED indicator 16 is controlled to make sound or light of the faster or lower repetition.

Figure 5:
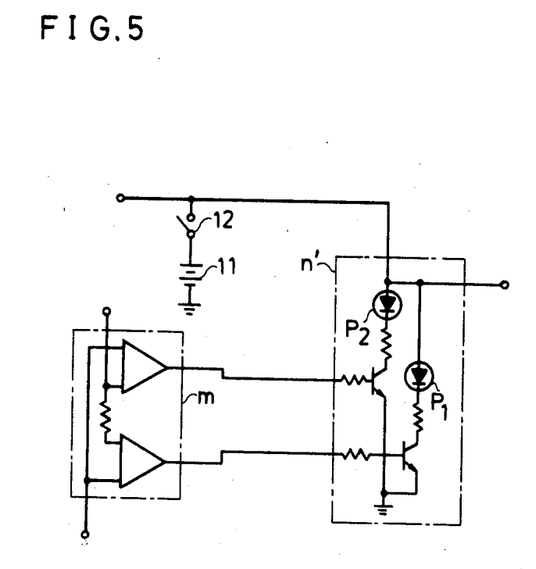
FIG. 5 is a circuit diagram of a part of another embodiment.

FIG. 5 shows a circuit of an example of the double ended limit detector m and a focus informing circuit n' employing LEDs, and relevant circuit thereabout.

In this circuit of FIG. 5, as the relation of the amount of input signal to the double ended limit detector changes, either one of the LEDs $P_1$ or $P_2$ is selectively lit. Therefore, by lighting two arrows of opposite directions by these LEDs $P_1$ or $P_2$ as shown in the informing means 16 of FIG. 6(b) or FIG. 7, directions to which the lens sleeve B should be moved can be easily indicated. In this example, for example, the focussing can be detected by both lightings of two LEDs. Alternatively, the focussing can be detected by both extinguishings of two LEDs.

Figure 6A:
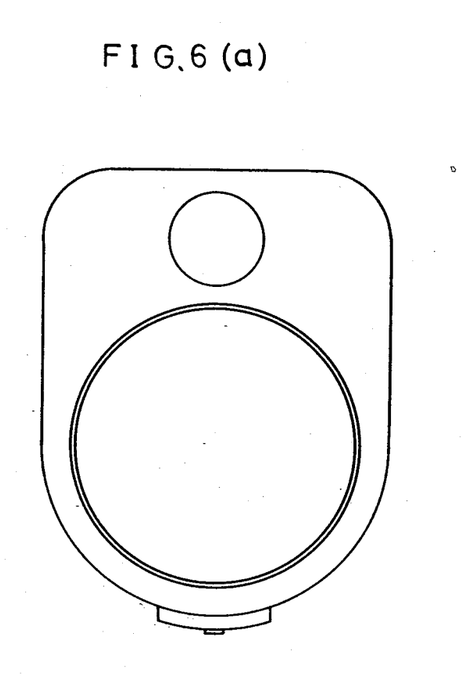
FIG. 6(a) is a front view of another example embodying the present invention.
Figure 6B:
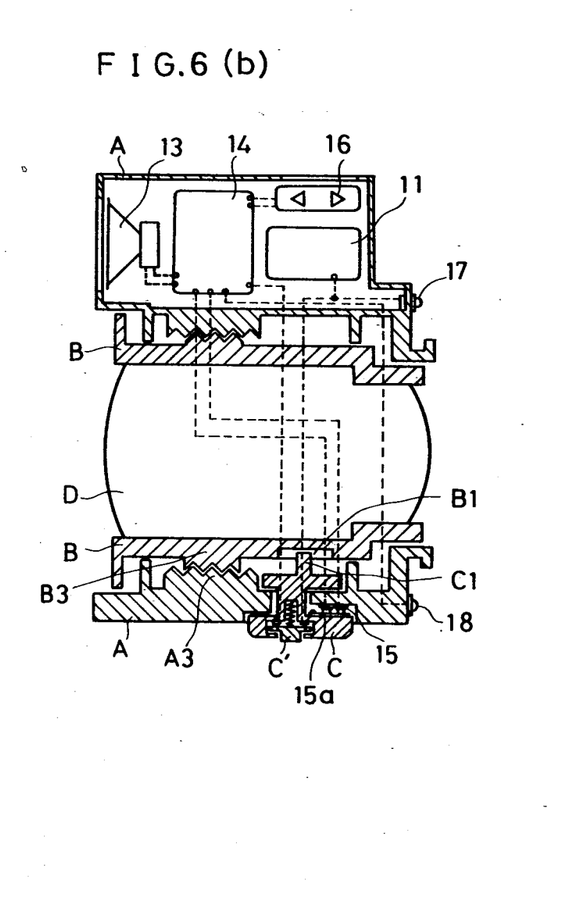
FIG. 6(b) is a sectional side view of the apparatus of FIG. 6(a).

FIG. 6 shows another embodiment of the present invention, where the inner sleeve or the lens holding sleeve B moves helically the lens axis, and the moving is made by handling the focussing ring C around the lens axis. By such motion of the focussing ring C, since a pin C1 slidingly engaging with an axially slidable slot B1, the inner sleeve B is rotated. The variable resistor 15 is fixed on a part of lens system housing A.

Figure 7:
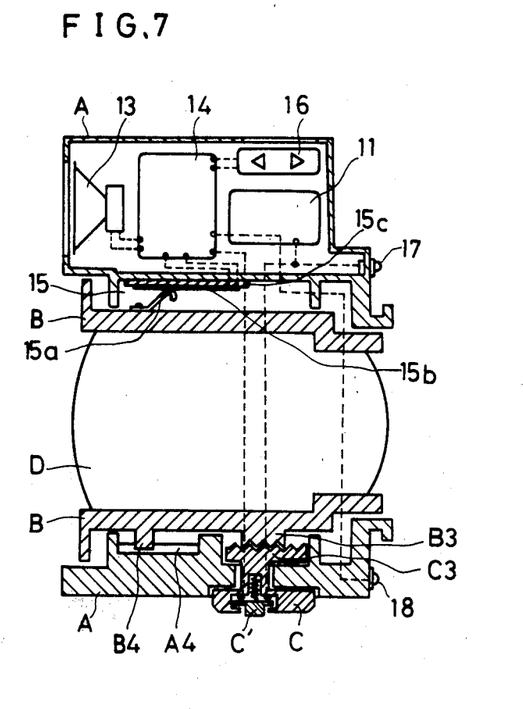
FIG. 7 is a sectional side view of another example embodying the present invention.

FIG. 7 shows another embodiment of the present invention, where the inner sleeve or the lens holding sleeve B does not rotate but simply moves in the axial direction of the lens. This is done by engaging a sliding pin B4 of the inner sleeve B to the slot A4 of the lens system housing A. The handle C is fixed to a rotatable inside helical thread C3 which engages with the outside helical thread B3. The variable resistor 15 in this example has a straightly extended substrate 15c on the inner wall of the lens system housing A and the slide contact 15a is fixed to the inner sleeve or the lens holding sleeve B, so that the slide contact moves linearly in a direction parallel to the lens axis.

The apparatuses in accordance with the present invention have the advantages (1) that the semi-automatic adjustment system has no electric motor or electromagnet which drives the heavy lens sleeve, and hence the power consumption is very small, thereby enabling to use a very small primary battery as the built-in power source, (2) that since the adjusting operation of the focussing ring or the focussing handle is manually made, a photographer can focus more precisely than the conventional fully-automated focussing system in which an effect of inertia of motion is inevitable, and (3) that the interchangeable lens itself contains the semi-automatic distance measurement system and hence the lens in accordance with the present invention can be used even for conventional camera body which does not have a distance measuring system.

Besides the above-mentioned examples, which utilize ultrasonic distance measuring, other distance measurement, for instance, known optical triangular distance measurement may be used. Practically, in the point of compactness, the ultrasonic measurement may be most convenient.

What is claimed is:

1. A photographic lens system for a photographic camera comprising,
   a photographic lens,
   a lens system housing which for holding said photographic lens, including a mounting means for detachable mounting on a camera body, said lens system housing comprising at least a means for adjusting focus by movement thereof and a cooperating handle, by which focussing is made,
   an electrically operated distance measuring means, provided in said lens system housing, for measuring distance to a principal object and generating a measured distance signal corresponding to said measured distance, an electrically operated adjustment indication means, provided in said lens system housing, for generating an adjusted distance signal corresponding to the distance of said principal object at which the lens is adjusted, an electrically operated comparator circuit which compares said measured distance signal and said lens adjustment signal, and generates a focus information signal, at least one electrically operated informing means responsive to said focus information signal, for generating discernable indicia of said focussing, and a switch cooperating with a hand on said lens system housing for selectively applying power from a power source to said distance measuring means, said adjustment indication means, said comparator circuit, and said informing means.

2. A photographic lens system in accordance with claim 1 wherein said power source is provided in said lens system housing.

3. A photographic lens system in accordance with claim 1 which further comprises an electric connector means, adapted to be connected to said camera body by said mounting means, for applying said power.

4. A photographic lens system in accordance with claim 1 or 2 which further comprises an electric connector, adapted to be connected to said camera body by said mounting means, said power being fed either through said connector or said power source which is provided in said lens system housing.

5. A photographic lens system in accordance with claim 1, 2, or 3, wherein said adjustment indication means is a variable resistor which includes:
a sliding contact means fixed on the inside part of a focussing ring, and
a slide resistor part to be slid by said sliding contact to vary resistance between terminals thereof, said slide resistor part being fixed on the inside part of a non-moving part of said lens system housing.

6. A photographic lens system in accordance with claim 1, 2, or 3, wherein said adjustment indication means is a variable resistor which includes,
a sliding contact means fixed on the outside part of a lens sleeve which fixedly holds lens and is mounted slidably in said lens system housing, and
a slide resistor part to be slid by said sliding contact to vary resistance between terminals thereof, said slide resistor part being fixed on the inside part of a non-moving part of said lens system housing.

7. A photographic lens system in accordance with claim 1, which further comprises an electric connector means connected to the output terminal of said comparator circuit and to be connected to a connector on said camera body for transferring output signal of said comparator circuit to said camera body.

8. A photographic lens system in accordance with claim 1, 2, 3, or 7 wherein said switch is a pressing-force-responsive switch disposed inside said cooperating handle of said focus adjusting means.

9. A photographic lens system in accordance with claim 1, 2, 3, or 7 wherein said switch is an electro-static switch which is responsive to a touching by a finger.

10. A lens system in accordance with claim 4, wherein said adjustment indication means is a variable resistor which includes:
a sliding contact means fixed on the inside part of a focussing ring, and
a slide resistor part to be slid by said sliding contact to vary resistance between terminals thereof, said slide resistor part being fixed on the inside part of a non-moving part of said lens system housing.

11. A photographic lens system in accordance with claim 4, wherein said adjustment indication means is a variable resistor which includes,
a sliding contact means fixed on the outside part of a lens sleeve which fixedly hold lens and is mounted slidably in said lens system housing, and
a slide resistor part to be slid by said sliding contact to vary resistance between terminals thereof, said slide resistor part being fixed on the inside part of a non-moving part of said lens system housing.

12. A photographic lens system in accordance with claim 4 wherein said switch is a pressing-force-responsive switch disposed inside said cooperating handle of said focus adjusting means.

13. A photographic lens system in accordance with claim 5, wherein said switch is a pressing-force-responsive switch disposed inside said cooperating handle of said focus adjusting means.

14. A photographic lens system in accordance with claim 6, wherein said switch is a pressing-force-responsive switch disposed inside said cooperating handle of said focus adjusting means.

15. A photographic lens system in accordance with claim 4, wherein said switch is an electrostatic switch which is responsive to a touching by a finger.

16. A photographic lens system in accordance with claim 5, wherein said switch is an electrostatic switch which is responsive to a touching by a finger.

17. A photographic lens system in accordance with claim 6, wherein said switch is an electrostatic switch which is responsive to a touching by a finger.

* * * * *